(12) United States Patent  
Yoon et al.

(10) Patent No.: US 8,021,206 B2  
(45) Date of Patent: Sep. 20, 2011

(54) FLUORESCENT LAMP, METHOD OF MANUFACTURING THE SAME, AND BACKLIGHT UNIT HAVING THE SAME

(75) Inventors: Junghyun Yoon, Gyeonggi-do (KR); Jinwoo Hong, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 228 days.

(21) Appl. No.: 11/311,659

(22) Filed: Dec. 20, 2005

(65) Prior Publication Data

US 2006/0138958 A1     Jun. 29, 2006

(30) Foreign Application Priority Data

Dec. 24, 2004   (KR) .......................... 10-2004-111737

(51) Int. Cl.
- H05B 33/10 (2006.01)
- H01J 9/00 (2006.01)
- H01J 9/20 (2006.01)
- H01J 9/24 (2006.01)
- H01J 11/00 (2006.01)
- H01J 61/06 (2006.01)
- H01J 65/00 (2006.01)

(52) U.S. Cl. .............. 445/26; 445/22; 445/23; 313/607; 313/618; 313/619; 313/623; 313/624; 313/631

(58) Field of Classification Search .............. 349/62–63, 349/65; 313/607, 627–643, 234, 213, 246, 313/244, 594, 613–615, 561; 362/561, 614–615; 257/10, 177; 445/22–26, 58, 70; 315/349

See application file for complete search history.

(56) References Cited

U.S. PATENT DOCUMENTS

| | | | | | |
|---|---|---|---|---|---|
| 672,451 | A | * | 4/1901 | Moore | 313/607 |
| 854,104 | A | * | 5/1907 | Moore | 313/566 |
| 1,676,790 | A | * | 7/1928 | Mailey | 313/607 |
| 1,758,516 | A | * | 5/1930 | Hendry | 313/607 |

(Continued)

FOREIGN PATENT DOCUMENTS

JP     2004253246 A  *  9/2004

(Continued)

OTHER PUBLICATIONS

Machine English translation of JP 2004253246 to Imai et al.*

*Primary Examiner* — Nimeshkumar Patel  
*Assistant Examiner* — Jose M Diaz  
(74) *Attorney, Agent, or Firm* — McKenna Long & Aldridge, LLP

(57) ABSTRACT

A fluorescent lamp that can be easily manufactured to provide high brightness and high efficiency, a method of manufacturing the same, and a backlight unit having the same are provided. First and second non-emissive glass tube are joined to an emissive glass tube coated with a phosphor, and first and second electrodes are formed on outer surfaces of the first and second non-emissive glass tubes. The first and second non-emissive tubes may have the same diameter as the emissive glass tube. The first and second non-emissive glass tubes are simply joined to the emissive glass tube, thereby reducing the manufacturing process and cost. The first and second non-emissive glass tubes are formed to be thinner than the emissive glass tube, thereby enhancing the brightness and efficiency of the fluorescent lamp.

6 Claims, 5 Drawing Sheets

U.S. PATENT DOCUMENTS

| | | | |
|---|---|---|---|
| 1,827,292 A * | 10/1931 | Laube | 313/356 |
| 1,832,212 A * | 11/1931 | Jacobsen | 315/58 |
| 2,552,678 A * | 5/1951 | Hirbec | 313/607 |
| 2,624,858 A * | 1/1953 | Greenlee | 313/607 |
| 2,786,882 A * | 3/1957 | Krefft | 174/50.64 |
| 5,013,966 A * | 5/1991 | Saikatsu et al. | 313/493 |
| 5,557,170 A * | 9/1996 | Ooms | 313/635 |
| 6,465,955 B1 * | 10/2002 | Kraus et al. | 313/567 |
| 6,710,535 B2 * | 3/2004 | Versluijs | 313/493 |
| 6,914,391 B2 * | 7/2005 | Takeda et al. | 315/223 |
| 6,930,735 B2 * | 8/2005 | Ohkawa et al. | 349/61 |
| 7,059,757 B2 * | 6/2006 | Shimizu | 362/561 |
| 7,159,999 B2 * | 1/2007 | Yoo et al. | 362/249 |
| 7,334,928 B2 * | 2/2008 | Gu et al. | 362/560 |
| 7,374,314 B2 * | 5/2008 | Jeong | 362/260 |
| 7,564,189 B2 * | 7/2009 | Murakami et al. | 313/607 |
| 2002/0021564 A1 * | 2/2002 | Cho et al. | 362/97 |
| 2002/0041268 A1 * | 4/2002 | Yajima et al. | 345/102 |
| 2003/0231512 A1 * | 12/2003 | Bang et al. | 362/560 |
| 2004/0125599 A1 * | 7/2004 | Takeda et al. | 362/263 |
| 2004/0256968 A1 * | 12/2004 | Kurita et al. | 313/234 |
| 2005/0253523 A1 * | 11/2005 | Tsai | 313/634 |
| 2006/0146561 A1 * | 7/2006 | Gu et al. | 362/560 |

FOREIGN PATENT DOCUMENTS

| | | |
|---|---|---|
| KR | 2001-0044259 | 6/2001 |
| KR | 2001-0074027 | 8/2001 |
| KR | 2004-0019751 | 3/2004 |

* cited by examiner

FLUORESCENT LAMP, METHOD OF MANUFACTURING THE SAME, AND BACKLIGHT UNIT HAVING THE SAME

This application claims the benefit of Korean Patent Application No. P2004-111737 filed in Korea on Dec. 24, 2004, which is hereby incorporated by reference for all purposes as if fully set forth herein.

BACKGROUND OF THE INVENTION

1. Field of the Invention

The present invention relates to a lamp, and more particularly, to a fluorescent lamp that can be easily manufactured to provide high brightness and high efficiency, a method of manufacturing the same, and a backlight unit having the same.

2. Description of the Related Art

Flat panel display devices include plasma display panels, field emission displays, light emitting diodes, and liquid crystal display devices (LCD).

In an LCD, data signals are supplied to pixels arranged in an active matrix configuration and light transmittance is adjusted by the displacement of liquid crystal according to the supplied data signals to display an image.

However, the LCD is not self-luminous and thus must receive light from an external light source.

Accordingly, a backlight unit serving as the external light source is provided on the bottom surface of the LCD. The backlight unit is categorized into an edge type backlight unit and a direct type backlight unit according to the arrangement of lamps.

The edge type backlight unit includes a lamp disposed on the side surface thereof to emit light to a side direction, a light guide plate converting the emitted light into surface light and guide the surface light in a forward direction, a reflection plate disposed on the bottom surface of the light guide plate to reflect the light in the forward direction, and an optical sheet diffusing the light from the light guide plate and adjusting the propagating direction of the light.

The direct type backlight unit includes a plurality of lamps disposed on a plane spaced apart from one another by a predetermined distance to emit light, a reflection plate disposed on the bottom surfaces of the lamps to reflect the emitted light in a forward direction, and an optical sheet diffusing the light from the lamps and adjusting the propagating direction of the light.

The lamp of the edge type and direct type backlight units may be a cold cathode fluorescent lamp (CCFL) or an external electrode fluorescent lamp (EEFL).

The CCFL can emit high-brightness light, but it is complex and expensive to manufacture.

Therefore, researches are actively conducted on the EEFL in recent days.

FIGS. 1A and 1B are sectional views of related art EEFLs.

Referring to FIG. 1A, a related art EEFL includes a glass tube 1 and first and second electrodes 3 and 4 that are formed respectively at both end portions of the glass tube 1. An inner surface of the glass tube 1 is coated with a phosphor 2 and an inner space thereof is filled with gas. The first and second electrodes 3 and 4 are formed to cover the both end portions of the glass tube 1.

When a voltage is applied across the first and second electrodes 3 and 4, electric charge is generated on inner surfaces of the both end portions of the glass tube 1. Due to the generated electric charge, the gas in the glass tube 1 is ionized by discharge. The ionized gas reacts on the phosphor 2 to generate light.

As described above, electric charges are generated in both inner end regions of the glass tube 1 that correspond to both outer end surfaces contacting the first and second electrodes 3 and 4.

However, the end region of the glass tube 1 has the same diameter as the center region thereof, and the area of the outer end region contacting the electrode is determined according to the length of the electrode. Therefore, the region where the electric charges are generated cannot be extended. Accordingly, it is difficult enhance the brightness and efficiency of the EEFL.

Referring to FIG. 1B, another related art EEFL includes a glass tube 5 and first and second electrodes 7 and 8 that are formed respectively at both end portions of the glass tube 5. An inner surface of the glass tube 5 is coated with a phosphor 6 and an inner space thereof is filled with gas.

Unlike the glass tube 1, the glass tube 5 has the end portion that is formed in a balloon so that the contact area between it and the electrode can be extended to generate greater electric charge in the inner surface of the glass tube 5. Accordingly, the EEFL of FIG. 1B has higher brightness and efficiency than the EEFL of FIG. 1A.

However, it is difficult, complex and time-consuming to form the end portion of the glass tube in a balloon shape. Also, it is difficult to form the balloon-shaped end portions of the glass tubes uniformly for every EEFLs.

SUMMARY OF THE INVENTION

Accordingly, the present invention is directed to a fluorescent lamp of a backlight unit that substantially obviates one or more problems due to limitations and disadvantages of the related art.

An advantage of the present invention is to provide a fluorescent lamp with high brightness and efficiency, a method of manufacturing the same, and a backlight unit having the same.

Another advantage of the present invention is to provide a fluorescent lamp that is easy to manufacture, a method of manufacture the same, and a backlight unit having the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a fluorescent lamp including: an emissive glass tube coated with a phosphor; first and second non-emissive glass tubes joined to the emissive glass tube; and first and second electrodes formed on outer surfaces of the first and second non-emissive glass tubes.

In another aspect of the present invention, there is provided a method of manufacturing a fluorescent lamp, the method including: forming an emissive glass tube having a first thickness, a first diameter, and both opened ends; forming first and second non-emissive glass tubes each having a second thickness, a second diameter larger than the first diameter, and one opened end; joining the emissive glass tube to the first and second non-emissive glass tubes; and forming first and second electrodes on outer surfaces of the first and second non-emissive glass tubes.

In a further another aspect of the present invention, there is provided a backlight unit including: a fluorescent lamp disposed at a side surface thereof, the fluorescent lamp including an emissive glass tube and first and second non-emissive glass tubes joined to the emissive glass tube; a light guide plate disposed on the same plane as the fluorescent lamp to guide light from the fluorescent lamp in a forward direction; and a reflection plate below the light guide plate to reflect the light in the forward direction.

In a still further another aspect of the present invention, there is provided a backlight unit including: a plurality of fluorescent lamps disposed on the same plane, the fluorescent lamps each including an emissive glass tube and first and second non-emissive glass tubes joined to the emissive glass tube; and a reflection plate below the fluorescent lamps to reflect light from the fluorescent lamps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 2:
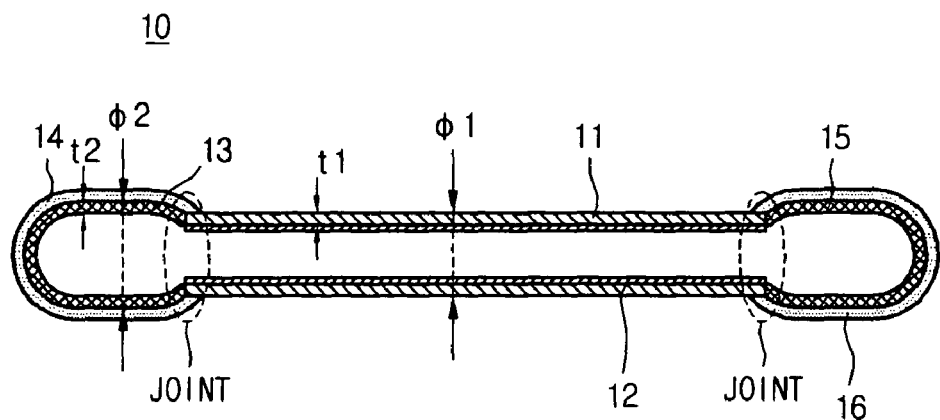
FIG. 2 is a sectional view of an EEFL according to a first embodiment of the present invention.

FIG. 2 is a sectional view of an EEFL 10 according to a first embodiment of the present invention.

Referring to FIG. 2, the EEFL 10 includes an emissive glass tube 11 whose inner surface is coated with a phosphor 12, first and second non-emissive glass tubes 13 and 15 joined to both ends of the emissive glass tube 11, and first and second electrodes 14 and 16 formed on outer surfaces of the first and second non-emissive glass tubes 13 and 15. The thickness of the non-emissive glass tube is identical to that of the emissive glass tube, but the diameter of the non-emissive glass tube is different from that of the emissive glass tube. The inner space formed by the emissive tube and the non-emissive tubes is filled with gas.

The emissive glass tube 11 may be formed of the same transparent material as the first and second non-emissive glass tubes 13 and 15.

Light generated at the inner space is emitted through the emissive glass tube 1 to an outside. However, the generated light cannot be emitted through the first and second non-emissive glass tubes 13 and 15 to the outside because it is blocked by the first and second electrodes 14 and 16 formed on the outer surface of the glass tubes 13 and 15.

The emissive glass tube 11 has a constant diameter $\Phi 1$ and a constant thickness $\Phi 1$. The phosphor 12 may be coated on the inner surface of the emissive glass tube 1 by the well-known method.

The diameter $\Phi 2$ of the non-emissive glass tube is different from that of the emissive glass tube 11, while the thickness t2 of the non-emissive glass tube is identical to that of the emissive glass tube 11.

The first and second electrodes 14 and 16 may be formed in a cap shape to cover the outer surfaces of the first and second non-emissive glass tubes 13 and 15. Alternatively, the first and second electrodes 14 and 16 may be coated on the outer surfaces of the first and second non-emissive glass tubes 13 and 15.

The emissive glass tube 11 is joined to the first and second non-emissive glass tubes 13 and 15. In detail, the first non-emissive glass tube 13 is joined to one end of the emissive glass tube 11, and the second non-emissive glass tube 15 is joined to the other end of the emissive glass tube 11. The joining of the non-emissive glass tube to the emissive glass tube 11 may be performed using a gas torch or static electricity. These joining methods are the well-known technologies and thus their descriptions will be omitted for conciseness.

Figure 1A:
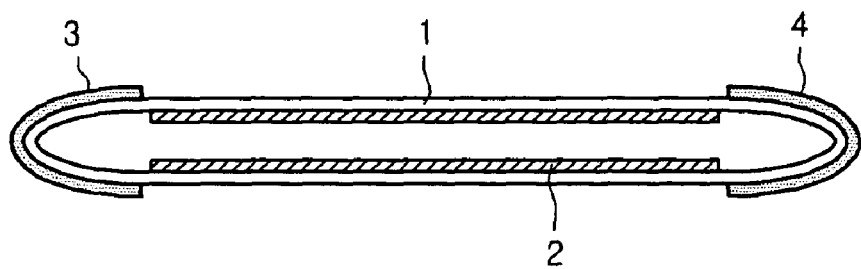
FIGS. 1A and 1B are sectional views of related art EEFLs.
Figure 1B:
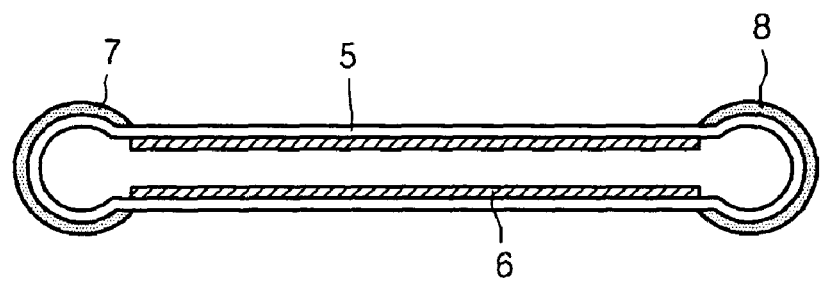

In case of the related art EEFL of FIG. 1B, the both ends of the glass tube 5 is heated and expanded by injection of, for example, air. These heating and expanding processes make the manufacturing method become complex and time-consuming. Also, this related art method cannot uniformly form the inner spaces of the both ends for every EEFL, causing the non-uniform brightness of the EEFL.

By contrast, in the first exemplary embodiment of the present invention, the emissive glass tube 11 and the first and second non-emissive glass tube are separately manufactured in advance and then they are joined to each other. Accordingly, the manufacturing process complexity and time can be reduced. Also, the inner space can be formed uniformly for every EEFL and thus the brightness can be obtained uniformly for every EEFL.

As described above, the first embodiment makes it possible to reduce the manufacturing process, time and cost and to obtain the uniform brightness for ever EEFL.

Figure 3:
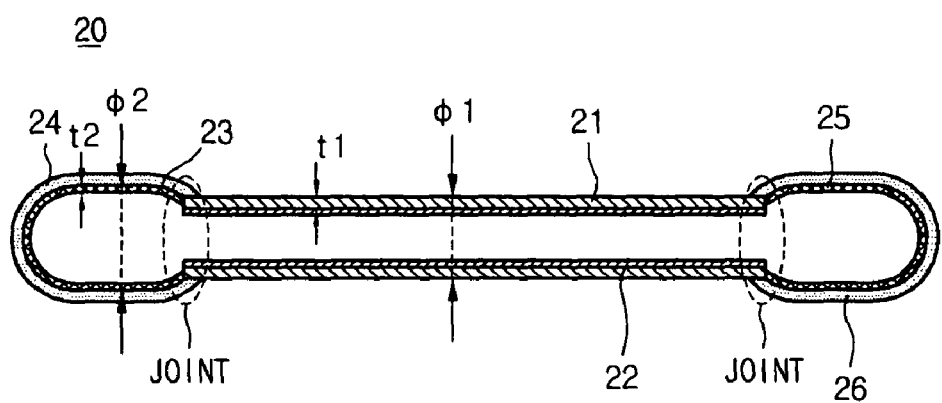
FIG. 3 is a sectional view of an EEFL according to a second embodiment of the present invention.

FIG. 3 is a sectional view of an EEFL 20 according to a second embodiment of the present invention.

In describing the second embodiment, the descriptions about the same or like parts as the first embodiment will be omitted for conciseness.

Referring to FIG. 3, the EEFL 20 includes an emissive glass tube 21 whose inner surface is coated with a phosphor 22, first and second non-emissive glass tubes 23 and 25 joined to both ends of the emissive glass tube 21, and first and second electrodes 24 and 26 formed on outer surfaces of the first and second non-emissive glass tubes 23 and 25. The non-emissive glass tube is different in thickness and diameter from the emissive glass tube 21.

The emissive glass tube 21 has a constant diameter $\Phi 1$ and a constant thickness t1.

The non-emissive glass tubes 23 and 25 have a diameter $\Phi 2$ larger than the diameter $\Phi 1$ of the emissive glass tube 21.

Accordingly, the non-emissive glass tube has an expanded inner space. Also, the non-emissive glass tubes 23 and 25 have a thickness t2 smaller than the thickness t1 of the emissive glass tube 21. Accordingly, the non-emissive glass tubes 23 and 25 have a wider space than the non-emissive glass tubes 13 and 15 in FIG. 2.

The first and second electrodes 24 and 26 may be formed in a cap shape to cover the outer surfaces of the first and second non-emissive glass tubes 23 and 25. Alternatively, the first and second electrodes 24 and 26 may be coated on the outer surfaces of the first and second non-emissive glass tubes 23 and 25.

Accordingly, the first and second non-emissive glass tubes 23 and 25 have a wider inner surface than the first and second non-emissive glass tubes 13 and 25. Therefore, compared to the first embodiment, a greater electric charge can be generated on the inner surfaces of the first and second non-emissive glass tubes 23 and 25. Consequently, the EEFL 20 can provide higher brightness and efficiency than the EEFL 10.

Also, since the first and second non-emissive glass tubes 23 and 25 have a smaller thickness t2, the EEFL 20 can be driven at a lower driving voltage to reduce the power consumption. As well known in the art, when a constant voltage is applied across the first and second electrodes 24 and 26, the amount of the generated charge increases as the thickness t2 of the non-emissive glass tube decreases. Accordingly, as the thickness t2 of the non-emissive glass tube decreases, a necessary driving voltage for a desired brightness decreases.

The emissive glass tube 21 is joined to the first and second non-emissive glass tubes 23 and 25. In detail, the first non-emissive glass tube 23 is joined to one end of the emissive glass tube 21, and the second non-emissive glass tube 25 is joined to the other end of the emissive glass tube 21.

As described above, the second embodiment makes it possible to reduce the manufacturing process and cost and to enhance the brightness and efficiency of the EEFL.

FIGS. 4A through 4D are views illustrating a method of manufacturing an EEFL according to an exemplary embodiment of the present invention.

This method relates to the EEFL 20 and can also be applied to the EEFL 10.

Figure 4A:
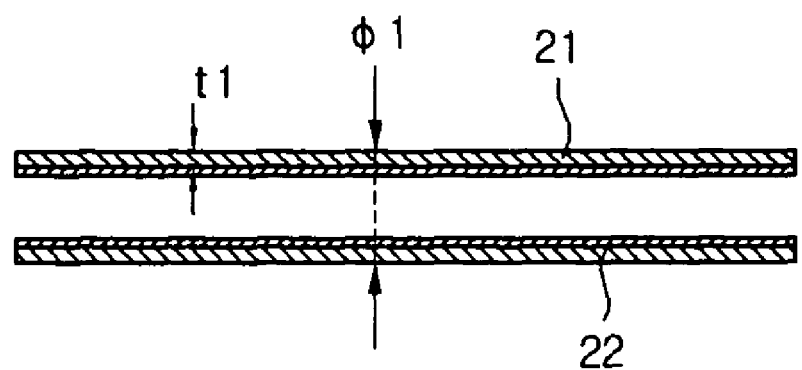
FIGS. 4A through 4D are views illustrating a method of manufacturing an EEFL according to an embodiment of the present invention.

Referring to FIG. 4A, an emissive glass tube 21 having a first thickness t1, a first diameter Φ1, and an inner surface coated with a phosphor 22 is formed. The first thickness t1 and the first diameter Φ1 are constant, and both ends of the emissive glass tube 21 are opened.

Figure 4B:
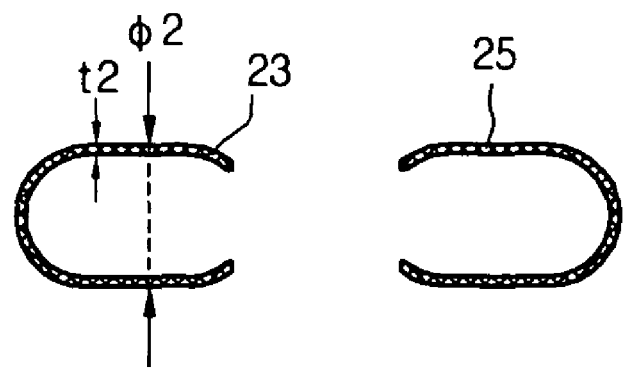

Referring to FIG. 4B, first and second non-emissive glass tubes 23 and 25 having a second thickness t2 smaller than the first thickness t1 and a second diameter Φ2 larger than the first diameter Φ1 are formed. One end of the non-emissive glass tube is opened and the other end is closed.

The first and second non-emissive glass tubes 23 and 25 are formed after the emissive glass tube 21 id formed, and vice versa.

Figure 4C:
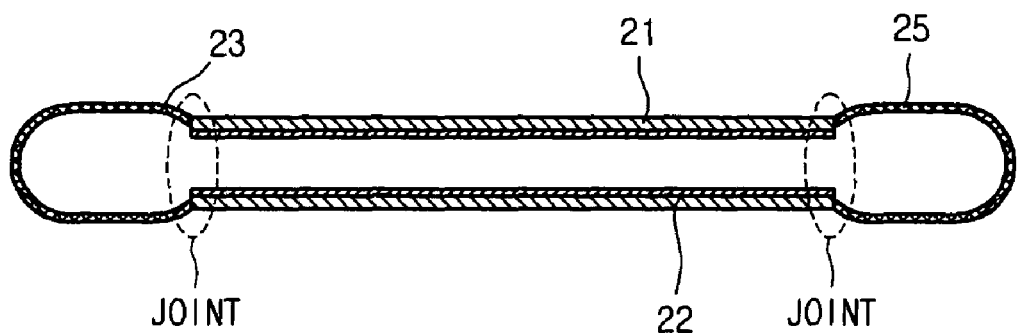

Referring to FIG. 4C, the opened end portions of the first and second non-emissive glass tubes 23 and 25 are respectively joined to the both ends of the emissive glass tube 21. This joining process may be performed using a gas torch or static electricity.

Figure 4D:
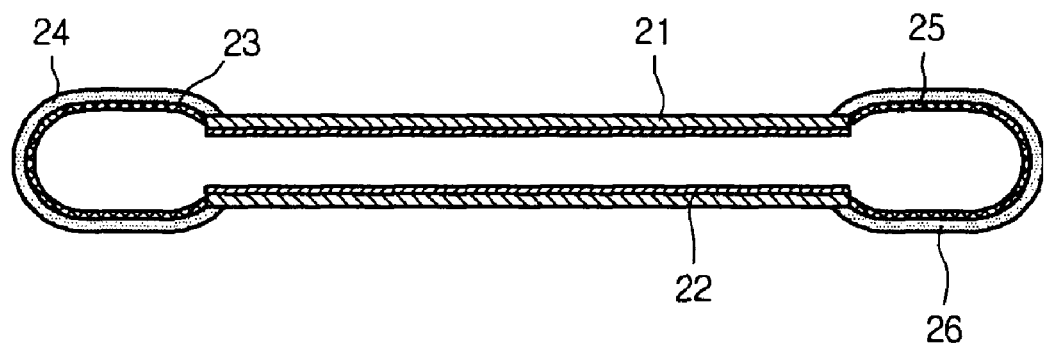

Referring to FIG. 4D, first and second electrodes 24 and 26 are respectively formed on outer surfaces of the first and second non-emissive glass tubes 23 and 25. It is preferably that the electrode is formed to cover the entire region of the outer surface of the non-emissive glass tube. The electrode may be formed on the outer surface of the non-emissive glass tube to cover a joint between the non-emissive glass tube and the emissive glass tube 21. This prevents the joint from being broken. Also, electric charge can also be generated at a partial inner surface of the emissive glass tube 21 corresponding to a portion of the electrode formed at the joint, thereby increasing the brightness.

Gas can be added through the injection hole (not illustrated) into an inner space defined by the emissive glass tube 21 and the first and second non-emissive glass tubes 23 and 25. This gas injection process may be performed before or after the formation of the first and second electrodes 24 and 26. After the gas injection process, the injection hole is sealed to maintain the vacuum state of the inner space.

The emissive glass tube 21 and the first and second non-emissive glass tubes 23 and 25 are joined as stated above, thereby reducing the manufacturing process and cost.

Figure 5:
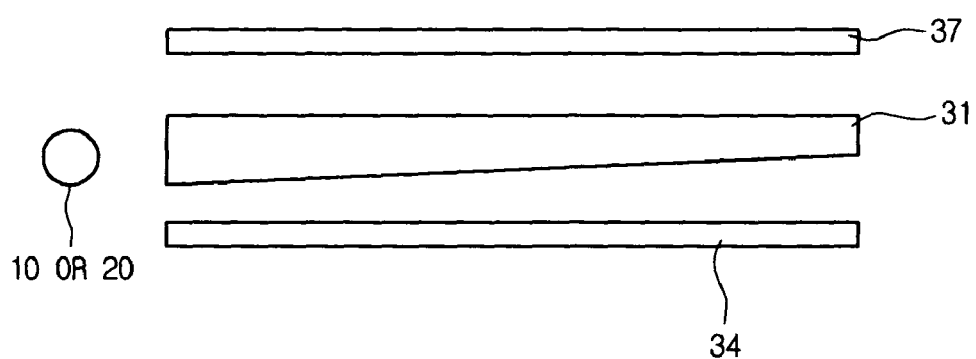
FIG. 5 is a schematic view of an edge type backlight unit with the EEFL according to the present invention.

FIG. 5 is a schematic view of an edge type backlight unit with the EEFL according to the present invention.

Referring to FIG. 5, the edge type backlight unit includes an EEFL disposed at the side thereof to generate light in a side direction, a light guide plate 31 disposed on the same plane as the EEFL to convert the light from the EEFL into surface light and guide the surface light in a forward direction, a reflection plate 34 disposed below the light guide plate 31 to reflect the light in the forward direction, and an optical sheet 37 disposed above the light guide plate 31 to diffuse the surface light from the light guide plate 31 and adjust the propagation direction of the light.

The EEFL may be one of the EEFL 10 and the EEFL 20.

As described above, in the EEFL 10, the diameter Φ2 of the first and second non-emissive glass tubes 13 and 15 is larger than the diameter Φ1 of the emissive glass tube 11, and thickness t2 of the first and second non-emissive glass tubes 13 and 15 is identical to the thickness t1 of the emissive glass tube 11.

In the EEFL 20, the diameter Φ2 of the first and second non-emissive glass tubes 23 and 25 is larger than the diameter Φ1 of the emissive glass tube 21, and thickness t2 of the first and second non-emissive glass tubes 23 and 25 is smaller than the thickness t1 of the emissive glass tube 21.

Although not illustrated, a separate reflection plate may be formed at the top, bottom, and rear of the EEFL 10 or 20 to reflect the light toward the light guide plate 31.

Figure 6:
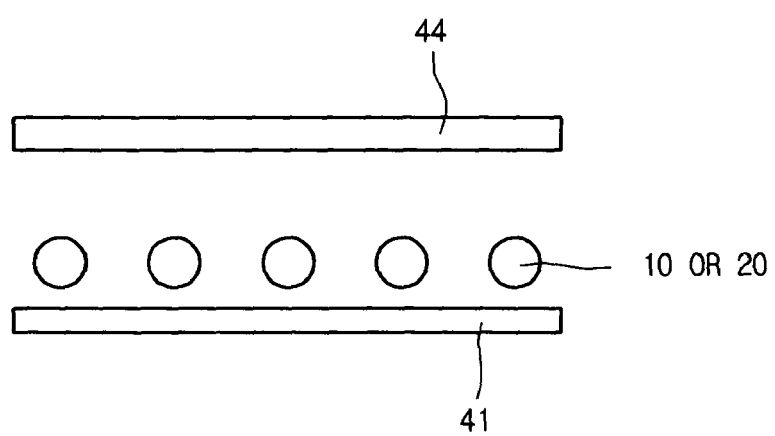
FIG. 6 is a schematic view of a direct type backlight unit with the EEFL according to the present invention.

FIG. 6 is a schematic view of a direct type backlight unit with the EEFL according to the present invention.

Referring to FIG. 6, the direct type backlight unit includes a plurality of EEFLs disposed on the same plane spaced apart from one another by a predetermined distance to generate light, a reflection plate 41 disposed below the EEFLs to reflect the light in a forward direction, and an optical sheet 44 disposed above the EEFLs to diffuse the surface light from the EEFLs and adjust the propagation direction of the light.

The EEFL may be one of the EEFL 10 and the EEFL 20.

As described above, the emissive glass tube and the non-emissive glass tube that have different diameters are simply joint to each other, thereby simplifying the manufacturing process, reducing the manufacturing cost, and proving the uniform brightness.

According to the present invention, the first and second non-emissive glass tubes are formed to be thinner than the emissive glass tube, thereby making it possible to enhance the brightness and efficiency of the EEFL.

Also, the EEFL are applied to the edge type backlight unit or the direct type backlight unit, thereby making it possible to enhance the brightness, efficiency and reliability of the backlight unit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of manufacturing a fluorescent lamp, the method comprising:
    forming an emissive glass tube having a first thickness, a first diameter, and both opened ends;
    forming first and second non-emissive glass tubes having a second diameter larger than the first diameter, a second thickness identical to the first thickness, and one opened end;
    joining both ends of the emissive glass tube to the first and second non-emissive glass tubes, respectively; and
    forming first and second electrodes on entire outer surfaces of the first and second non-emissive glass tubes,
    wherein the first and second electrodes have a cap shape and cover entire circumferences of two joints formed by joining the both ends of the emissive glass tube to the first and second non-emissive glass tubes,
    wherein the first and second non-emissive glass tubes are made of the same material as the emissive glass tube,
    wherein each of the first and second non-emissive glass has a opening portion corresponding to the both ends of the emissive glass tube, and
    wherein joining both ends of the emissive glass tube to the first and second non-emissive glass tubes performed using a gas torch or static electricity.

2. The method according to claim 1, further comprising filling gas into an inner space defined by the emissive glass tube and the first and second non-emissive glass tubes.

3. The method according to claim 2, wherein the filling of the gas is performed after the joining of the emissive glass tube to the first and second non-emissive glass tubes.

4. The method according to claim 2, wherein the filling of the gas is performed after the forming of the first and second electrodes.

5. A method of manufacturing a fluorescent lamp, the method comprising:
    forming an emissive glass tube having a first thickness, a first diameter, and both opened ends;
    forming first and second non-emissive glass tubes having a second diameter larger than the first diameter, a second thickness smaller than the first thickness, and one opened end;
    joining both ends of the emissive glass tube to the first and second non-emissive glass tubes, respectively; and
    forming first and second electrodes on entire outer surfaces of the first and second non-emissive glass tubes in whole,
    wherein the first and second electrodes have a cap shape and cover entire circumferences of two joints formed by joining the both ends of the emissive glass tube to the first and second non-emissive glass tubes,
    wherein the first and second non-emissive glass tubes are made of the same material as the emissive glass tube,
    wherein each of the first and second non-emissive glass has a opening portion corresponding to the both ends of the emissive glass tube, and
    wherein joining both ends of the emissive glass tube to the first and second non-emissive glass tubes performed using a gas torch or static electricity.

6. The method according to claim 1, further comprising forming a phosphor on the emissive glass tube.

* * * * *